(12) United States Patent
Grimme et al.

(10) Patent No.: US 11,009,917 B2
(45) Date of Patent: May 18, 2021

(54) DEVICE WITH STAND

(71) Applicant: Lenovo (Singapore) Pte. Ltd., Singapore (SG)

(72) Inventors: Jason M. Grimme, Cary, NC (US); Peter Hamilton Wetsel, Raleigh, NC (US); Joshua Neil Novak, Wake Forest, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 1362 days.

(21) Appl. No.: 14/453,435

(22) Filed: Aug. 6, 2014

(65) Prior Publication Data
US 2016/0041588 A1 Feb. 11, 2016

(51) Int. Cl.
*G06F 1/16* (2006.01)

(52) U.S. Cl.
CPC .......... *G06F 1/1666* (2013.01); *G06F 1/1656* (2013.01); *G06F 1/1667* (2013.01); *G06F 1/1679* (2013.01)

(58) Field of Classification Search
CPC .......................................... G06F 1/16
USPC ...................... 361/679.01–679.03
See application file for complete search history.

(56) References Cited

U.S. PATENT DOCUMENTS

| | | | | |
|---|---|---|---|---|
| 5,150,222 A * | 9/1992 | Nakayama | ............. | G03G 15/00 312/244 |
| 6,108,200 A * | 8/2000 | Fullerton | ............. | G06F 1/1632 235/145 R |
| 2002/0149908 A1* | 10/2002 | Tsai | ...................... | G06F 3/0231 361/679.4 |
| 2004/0056843 A1* | 3/2004 | Lin | ....................... | G06F 1/1616 345/168 |
| 2005/0066477 A1* | 3/2005 | Yang | ..................... | G06F 1/1679 16/374 |
| 2007/0091070 A1* | 4/2007 | Larsen | ................... | G06F 3/0213 345/168 |
| 2011/0133619 A1* | 6/2011 | Ma | ....................... | G06F 1/1681 312/326 |
| 2011/0260014 A1* | 10/2011 | Chen | ...................... | F16M 11/10 248/157 |
| 2012/0195295 A1* | 8/2012 | Elmaleh | ................ | H04W 4/023 370/338 |

OTHER PUBLICATIONS

Alibaba.com, BTBK SAH-003SS, Dec. 21, 2010 https://www.alibaba.com/showroom/swivel-pivot-hinge.html.*

(Continued)

*Primary Examiner* — Jerry Wu
(74) *Attorney, Agent, or Firm* — Brian J. Pangrle

(57) ABSTRACT

A device can include a processor; memory operatively coupled to the processor; a keyboard housing that includes a keyboard accessible to the processor and an extractable extension; and a display housing that includes a display operatively coupled to the processor and a keyboard housing recess, where, in a compact orientation, the keyboard housing seats in the keyboard housing recess and where, in an extended orientation, the keyboard housing and the extractable extension extend to form a base that supports the display housing at a viewing angle with respect to the base.

18 Claims, 8 Drawing Sheets

(56) References Cited

OTHER PUBLICATIONS

Alibaba.com, Iron Pivot Hinge, butt hinge with high quality, Dec. 21, 2010 https://www.alibaba.com/trade/search?fsb=y&IndexArea=product_en&CatId=&SearchText=pivot+hinge&isGalleryList=Ghttps://www.alibaba.com/product-detail/Iron-pivot-hinge-butt-hinge-with_60496439635.html?spm=a2700.7724838.2017115.1.3c93b095LgV0db.*

Alibaba.com, Aluminum extruded rotating hing for door, Dec. 21, 2010 https://www.alibaba.com/trade/search?fsb=y&IndexArea=product_en&CatId=&SearchText=rotat+hinge&isGalleryList=Gc.*

Howard, "Acer TravelMate 100", PC Magazine, May 7, 2002 (3 pages).

Pierce, "Lenovo ThinkPad Twist review", The Verge, Dec. 6, 2012 (12 pages).

Lenovo ThinkPad Twist S230u Center Swivel Hinge, YouTube, Aug. 21, 2012 (1 page).

* cited by examiner

DEVICE WITH STAND

TECHNICAL FIELD

Subject matter disclosed herein generally relates to information handling devices.

BACKGROUND

An information handling device with a form factor such as that of a tablet may be used in a hand-held manner. However, at times, a user may desire to use such a device with a keyboard where, ergonomically, input via the keyboard is easier when the device is supported at an appropriate viewing angle (e.g., to allow for coordination of input via the keyboard and information rendered to a display).

SUMMARY

A device can include a processor; memory operatively coupled to the processor; a keyboard housing that includes a keyboard accessible to the processor and an extractable extension; and a display housing that includes a display operatively coupled to the processor and a keyboard housing recess, where, in a compact orientation, the keyboard housing seats in the keyboard housing recess and where, in an extended orientation, the keyboard housing and the extractable extension extend to form a base that supports the display housing at a viewing angle with respect to the base. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
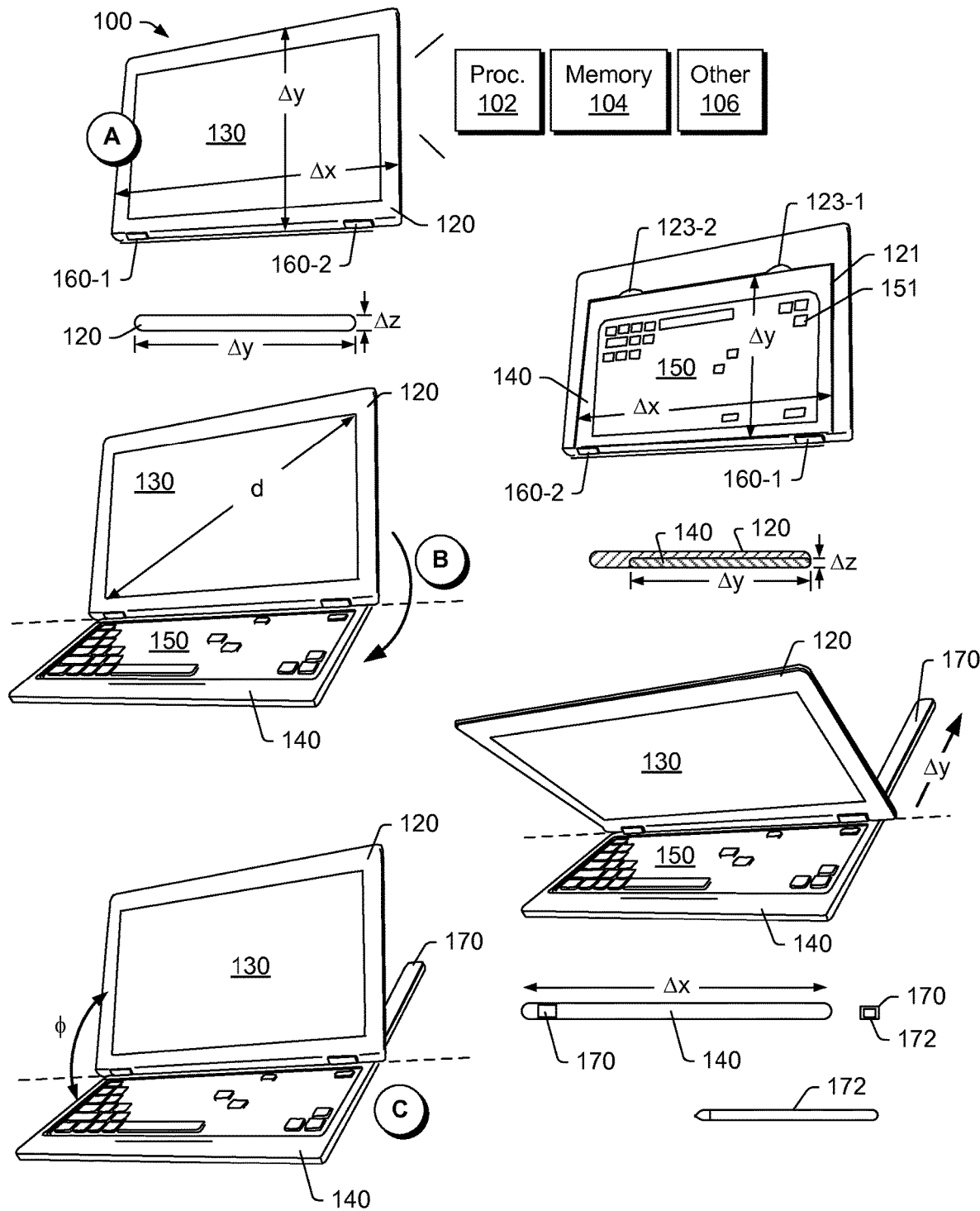
FIG. 1 is a diagram of an example of a device.

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, an information handling device can include a processor (e.g., or processors) and memory accessible by the processor. Such a device may include instructions stored in the memory that may be executed by the processor, for example, to establish an operating system environment. A device may receive information and process information and, for example, render information to a display, which may be a touchscreen display.

As an example, an information handling device may be configured according to a form factor such as a tablet form factor (e.g., a pad, etc.) that includes at least one display. As an example, such a device may include an input component such as, for example, a keyboard. In such an example, the input component and the display may be oriented such that an angle exists between the input component and the display where the angle allows for viewing of the display while interacting with the input component. For example, consider an orientation such as that of a notebook computer where a keyboard portion is horizontal and where a display portion is oriented at an angle, for example, generally about 90 degrees or more (e.g., an obtuse angle) for purposes of viewing a display of the display portion while typing on keys of the keyboard portion.

As an example, a device may be a tablet device that can be oriented in a standing position using an adjustable input component of the tablet device. In such an example, the input component may be a keyboard housed in a keyboard housing where the tablet device includes a display housing with a display on one side and a recess on another side where the recess can at least partially receive the keyboard housing. As an example, the aforementioned display housing and keyboard housing may be oriented such that at least a portion of the keyboard housing supports the display housing at a viewing angle. Further, the device may include an extension that can extend from the keyboard housing to help support the display housing at the viewing angle. For example, with respect to a display side and a recess side of the display housing, the keyboard housing may be positioned at least in part on the display side and the extension may be positioned at least in part on the recess side. In such an example, support exists on both sides of the tablet device.

As an example, a device can include a display housing with a display and an input component with an extension such that the display housing may be oriented at one of a plurality of angles, which may be viewing angles for the display. In such an example, a viewing angle may be defined with respect to an input surface of the input component and a display surface of a display of the display housing. And, in such an example, the extension and the input surface may be at an angle of approximately 180 degrees and the display surface at an angle less than 180 degrees, for example, at a viewing angle that may be about 90 degrees or more as measured from the input surface.

As an example, an extension may provide for orienting a display of a display housing at an angle greater than about 90 degrees from horizontal (e.g., of an input surface of an input component) with reduced risk of the display housing tipping toward horizontal (e.g., from about 90 degrees to about 180 degrees as measured from horizontal). For example, where a display housing of a device houses a display with associated touch sensitive circuitry, an extension may reduce risk of tipping of the device where a user contacts the display to input information (e.g., selections, etc.) via touch. In such an example, a user may be less apprehensive about using touch as an input mode and thereby enhance the user's experience of the device.

As an example, a device can include a display housing and an input component that may be formed as a wing that can rotate from the back of the display housing over an angle of about 270 degrees. In such an example, the wing may include a keyboard for input (e.g., typing, etc.) and may include a telescopic component that can be positioned to form a telescopic stand. For example, a telescopic component may be protractible from the input component in a manner where the telescopic component slides through or under the display housing and to extend behind the display housing to provide support for the display housing to stand up, for example, creating an upside-down T shape.

As an example, a device can include a rotational wing that includes a protractible element with a support surface (e.g., table contact surface, etc.). In such an example, the device may include one rotational wing and one or more protractible elements. As an example, a rotational wing may be positionable to extend on either side of a display housing. For example, a rotational wing may include supporting surfaces or flaps on both sides, which may provide support for the display housing to stand vertically or at another viewing angle. As an example, a stand flap that protracts from a wing may be configured to slide under a display housing or, for example, slide through aligned holes in a display housing. For example, a device may include a hinge unit that operatively couples a wing and a display housing where the hinge unit includes one or more holes or openings that may receive a protractible element or elements.

As an example, an input component may include a thickness that exceeds that of a protractible element. As an example, a protractible element may protract from an input component, which may be, for example, a keyboard housing that includes a keyboard or, for example, a touch sensitive surface that responds to human touch, stylus touch (e.g., active and/or passive), etc. As an example, an input component may be configured as digitizer that may respond to one of active input, passive input or active and passive input.

As an example, a keyboard housing may include a keyboard that is protractible from the keyboard housing. For example, the keyboard housing may be a wing that can pivot about an axis to a desired orientation and where the keyboard may extend from the keyboard housing. In such an example, the keyboard housing may pivot about the axis an angle less than about 90 degrees and remain on a back side of a display housing where the keyboard can be protracted from the keyboard housing to be on a front side of the display housing. In such an example, the keyboard housing may provide a support surface and the keyboard may provide a support surface, for example, forming with a display of a display housing, an approximately upside down T-shape. As an example, a device may include a keyboard protractible from a keyboard housing, a touch pad protractible from a touch pad housing, a digitizer protractible from a digitizer housing, etc. As an example, a device may include a support element protractible from a keyboard housing, a support element protractible from a touch pad housing, a support element protractible from a digitizer housing, etc. As an example, a device may include a rotational keyboard with a protractible stand.

FIG. 1 shows an example of a device 100 that includes a processor 102, memory 104 and other circuitry 106. As shown, the device 100 includes a display housing 120 with a display 130, a keyboard housing 140 with a keyboard 150 and one or more hinge units 160-1 and 160-2. As shown, the keyboard 150 includes a plurality of keys 151, which may be mechanically depressible keys (e.g., that travel a distance) and/or touch sensitive keys (e.g., that respond to touch such as via capacitive touch sensing circuitry).

Various features of the device 100 may be described with respect to one or more coordinate systems. For example, various features of the device 100 may be defined in a Cartesian coordinate system with a length along an x-axis, a width along a y-axis and a thickness along a z-axis. As an example, the device 100 may have a tablet form factor. A tablet may be a mobile computing device (e.g., an information handling device) with a display, circuitry and a battery. A tablet may include one or more sensors (e.g., one or more cameras, microphones, accelerometers, gyroscopes, touchscreens, etc.). A tablet may include one or more physical buttons (e.g., to control features such as speaker volume, power, etc.) and may include one or more ports (e.g., consider a network interface port, battery charger port, display port, USB port, etc.). As an example, a diagonal dimension of a tablet may be about 7 inches (e.g., about 18 cm) or more.

As an example, a tablet may include a processor (e.g., single or multicore), memory (e.g., multiple GB, SDRAM, etc.), an operating system (e.g., stored in memory as executable instructions and/or in circuitry), a display (e.g., IPS, LED backlight, anti-glare, multi-touch, etc.), a graphics processor (e.g., about 1080p video at about 30 fps, etc.), digital storage (e.g., hard drive, solid-state drive, etc.), one or more batteries (e.g., lithium-based rechargeable, etc.), a digitizer, a stylus (e.g., digitizer pen), a speaker or speakers, a microphone of microphones, a camera or cameras, a flash or flashes, ports (e.g., USB, HDMI, etc.), a slot or slots (e.g., SD slot), a jack or jacks, GPS circuitry, compass circuitry, ambient light sensor circuitry, proximity sensor circuitry, WLAN circuitry, mobile broadband circuitry, Bluetooth® circuitry, etc.

As an example, a device may include one or more batteries in a display housing and/or one or more batteries in an input component, which may be a keyboard housing, a touch pad housing, a digitizer housing, etc. where the input component may be configurable to support the display housing at a viewing angle.

As shown in the example of FIG. 1, the display housing 120 includes a recess 121 and optionally one or more supplemental recesses 123-1 and 123-2 that may facilitate griping of the keyboard housing 140, for example, to extract the keyboard housing 140 from the recess 121 of the display housing 120. For example, the device 100 may be oriented in a compact orientation ("A"), an intermediate orientation ("B") or an extended orientation ("C") via positioning of the keyboard housing 140 with respect to the display housing 120 and via positioning of an extractible extension 170 with respect to the keyboard housing 140. For example, as shown in the extended orientation ("C"), the keyboard housing 140 and the extractible extension 170 support the display housing 120 such that the display 130 is at a viewing angle. As shown, the keys 151 of the keyboard 150 are facing upwardly, away from a support surface that is in contact with at least one of a lower surface of the keyboard housing 140 and a lower surface of the extractible extension 170. In such an orientation, the display housing 120 may be maintained at a viewing angle with reduced risk of tipping of the display housing 120 backwards as the extractible extension 170 may prevent or otherwise limit such tipping motion.

In the example of FIG. 1, the extractible extension 170 is shown as being extractible from the keyboard housing 140 in a relatively linear manner. As an example, such an extension may be pivotably extracted from the keyboard housing. For example, upon pivoting the keyboard housing 140 out of the recess 121 via the one or more hinge units 160-1 and 160-2, the extension 170 may be extracted via linear and/or rotational motion. As an example, a user may extract the extension 170 prior to pivoting of the keyboard housing 140 out of the recess 121. Or, for example, a locking mechanism may act to lock the extension 170 in the keyboard housing 140 until the keyboard housing 140 is pivoted, for example, out of the recess 121 and/or to a display side of the display housing 120.

As an example, the extension 170 may be configured to store a stylus 172. For example, the extension 170 may include a channel, a lumen, etc. that can receive the stylus 172, which may be removable for use with a touchscreen display, a digitizer, etc.

As an example, a device can include a processor; memory operatively coupled to the processor; a keyboard housing that includes a keyboard accessible to the processor and an extractable extension; and a display housing that includes a display operatively coupled to the processor and a keyboard housing recess, where, in a compact orientation, the keyboard housing seats in the keyboard housing recess and where, in an extended orientation, the keyboard housing and the extractable extension extend to form a base that supports the display housing at a viewing angle with respect to the base. For example, consider the keyboard housing 140 and the extension 170 of the device 100 of FIG. 1 as forming a base for the display housing 120.

As an example, a device may include a hinge that operatively couples a keyboard housing and a display housing. For example, consider the one or more hinge units 160-1 and 160-2 of the device 100 of FIG. 1. As an example, a keyboard housing may pivot about hinge or hinges to orient the keyboard housing in a recessed state that corresponds to compact orientation (see, e.g., the orientation "A" of FIG. 1) or a base state that corresponds to an extended orientation (see, e.g., the orientation "C" of FIG. 1). As an example, a device may include a keyboard housing that is pivotable about a hinge or hinges by a pivot angle greater than 180 degrees.

As an example, a device may, in an extended orientation, have a keyboard housing positioned on a display side of a display housing and an extractable extension extended away from the keyboard housing and positioned on a non-display side of the display housing.

As an example, a device may include a keyboard housing that includes a plurality of extractable extensions. As an example, an extractable extension may be or include a keyboard cover. As an example, a device may include a swivel mechanism that swivels a keyboard housing with respect to a display housing to orient keys of a keyboard. For example, in a compact orientation, the keys of the keyboard may be oriented inwardly and, in the extended orientation, the keys of the keyboard may be oriented upwardly.

As an example, a device can include an intermediate orientation where a keyboard housing, with an extractable extension in an unextracted state, is positioned to form an angle with respect to the display housing.

As an example, a keyboard can include depressible keys. As an example, a keyboard can include a touch-sensitive panel, optionally as a touch pad. As an example, a device can include a touch-sensitive display.

As an example, a device may include wireless communication circuitry that at least in part operatively couples a keyboard of a keyboard housing to a processor, which may be disposed in a display housing of the device.

Figure 2:
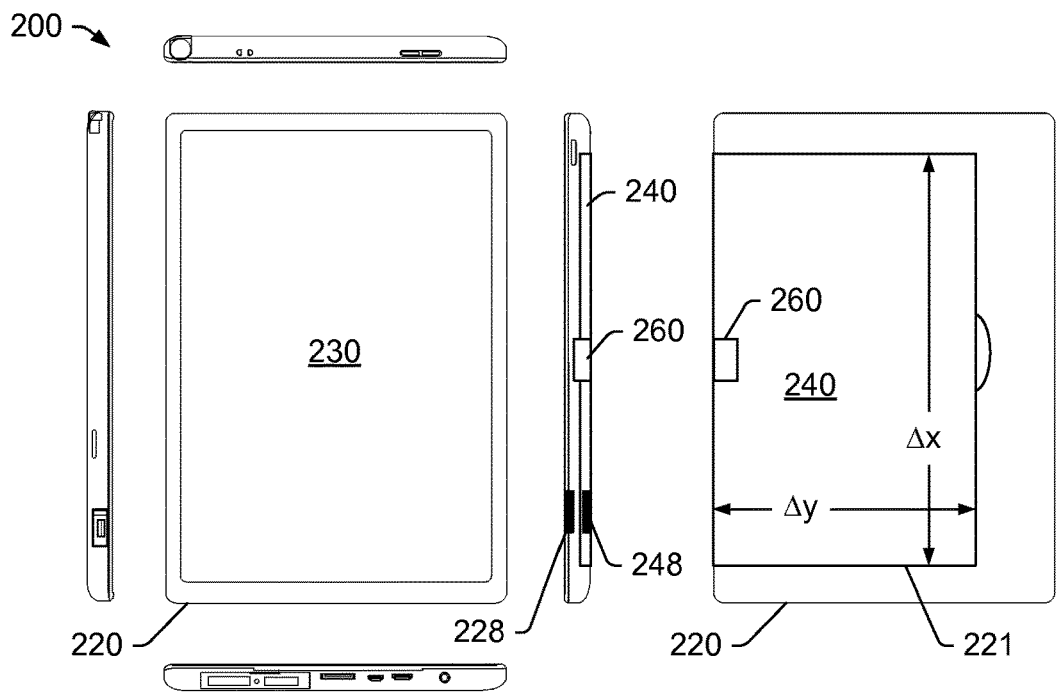
FIG. 2 is a diagram of an example of a device.
Figure 2:
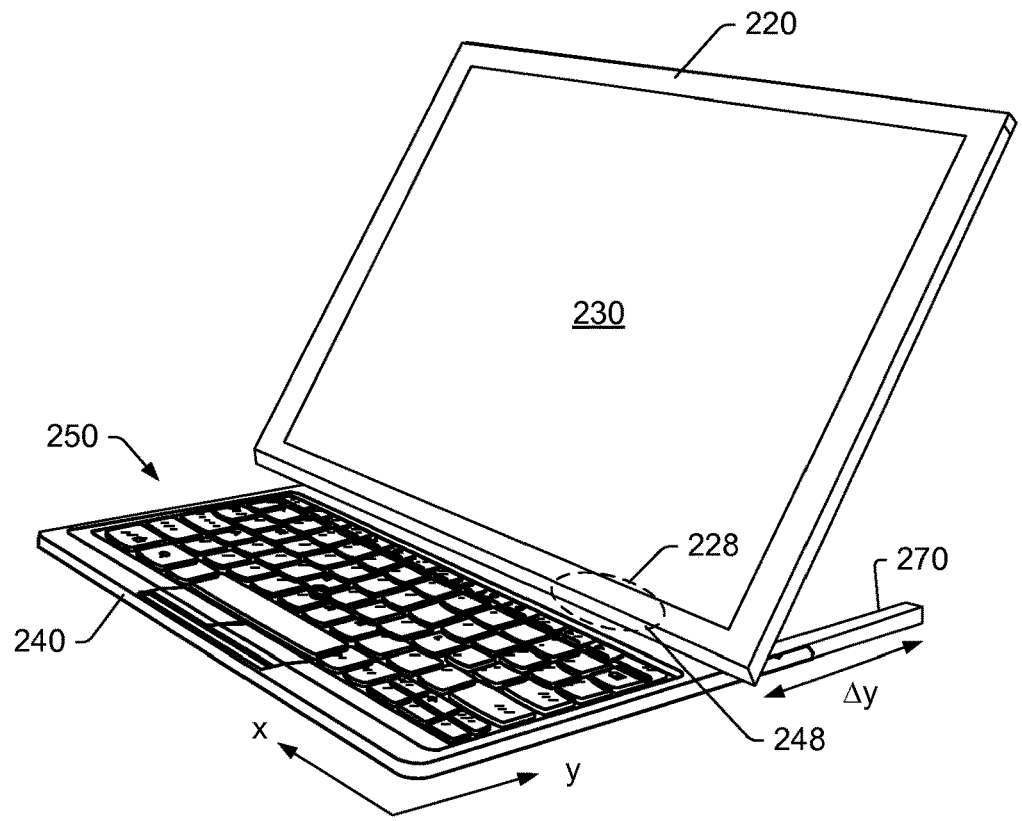

FIG. 2 shows an example of a device 200 that includes a display housing 220, a display 230, a keyboard housing 240, a keyboard 250 and an extractible extension 270. The device 200 may include various features such as those described with respect to the device 100 of FIG. 1. As an example, the keyboard housing 240 may be positionable to have keys of the keyboard 250 facing inwardly in a recess 221 of the display housing 220. As an example, the keyboard housing 240 may be removable from the recess 221 and positionable to support the display housing 220 with the keys of the keyboard 250 facing upwardly. As an example, the keyboard housing 240 may be operatively coupled to the display housing 220 via a swivel hinge 260 that can allow for pivoting and swiveling of the keyboard housing 240, for example, to orient the keys of the keyboard 250. As an example, a display housing may include circuitry that orients an upside and a downside of a display when a keyboard housing is oriented to support the display housing at a viewing angle.

As an example, the device 200 may provide for wireless and/or wired communications between circuitry of the display housing 220 and circuitry of the keyboard housing 240. As an example, the display housing 220 may include an interface 228 and the keyboard housing 240 may include an interface 248. As shown, the interfaces may be physical interfaces that operatively couple when the keyboard housing 240 is oriented with respect to the display housing 220 (e.g., via rotation of the keyboard housing 240 with respect to the display housing 220). Such interfaces may include emitter and detector circuitry for wireless communication (e.g., RF, IR, etc.). Such interfaces may include contact surfaces that can make electrical connections. For example, such interfaces may include male and/or female contact surfaces that couple when the keyboard housing 240 is oriented to support the display housing 220 at a viewing angle. As an example, typing on keys of a keyboard may generate signals that can be transmitted via operatively coupled interfaces to allow such signals to instruct a processor, an operating system, an application, firmware, etc.

As an example, a device can include a processor; memory operatively coupled to the processor; a keyboard housing that includes a keyboard and a first keyboard interface; and a display housing that includes a display operatively coupled to the processor, a second keyboard interface and a keyboard housing recess, where, in a compact orientation, the keyboard housing seats in the keyboard housing recess and where, in an extended orientation, the keyboard housing forms a base that supports the display housing at a viewing angle with respect to the base and the first keyboard interface electrically contacts the second keyboard interface.

Figure 3:
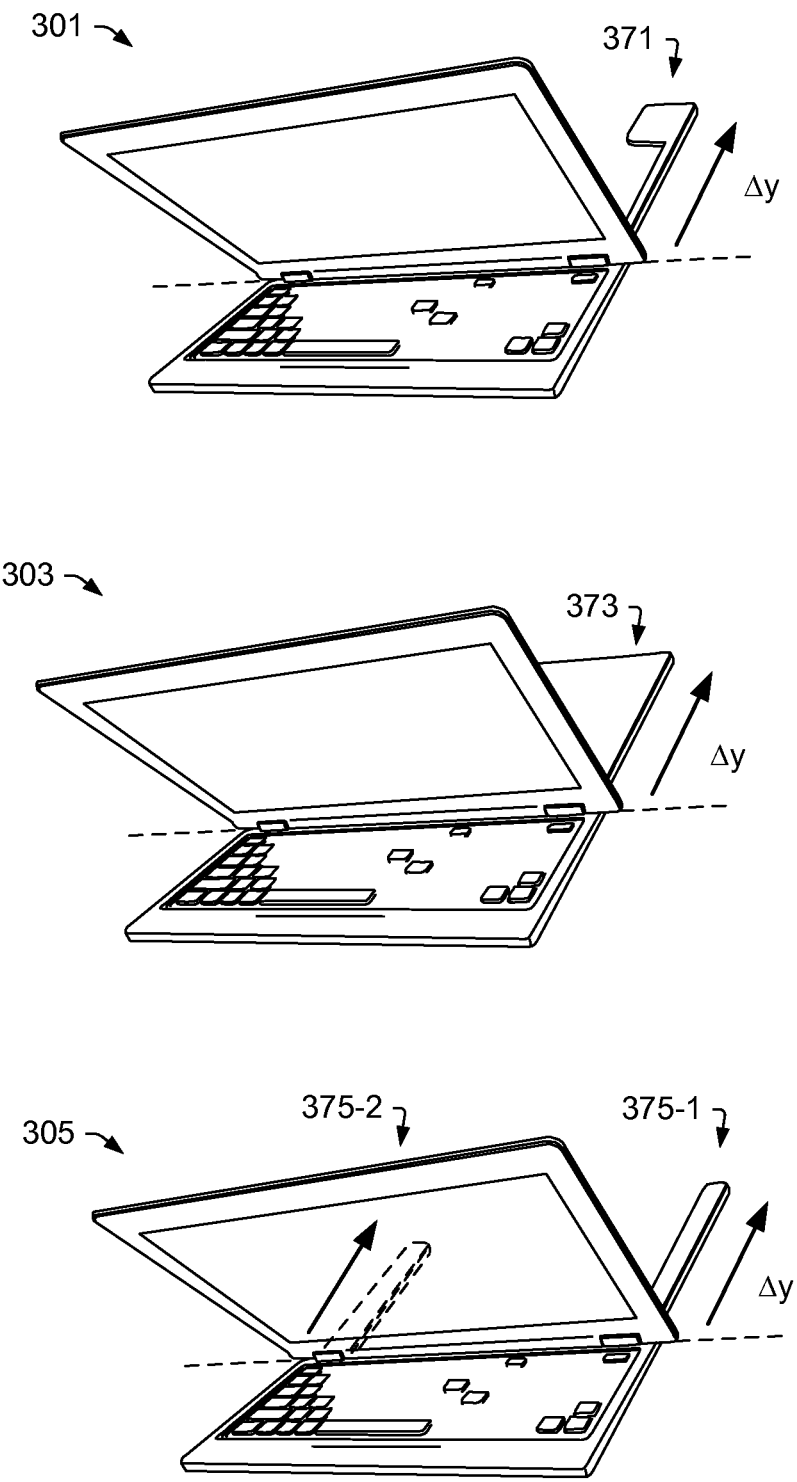
FIG. 3 is a diagram of examples of devices.

FIG. 3 shows examples of devices 301, 303 and 305 where the device 301 includes an extractible extension 371, the device 303 includes an extractible extension 373 and where the device 305 includes one or more extractible extensions 375-1 and 375-2. As shown, the extractible extension 371 may include a larger surface proximate to an end that extends away from the device 301. As shown, the extractible extension 373 may be a relatively planar extension that may have a width that can provide further assurances against tipping. As shown, the extractible extensions 375-1 and 375-2 may be used in combination with each other or optionally individually, for example, depending on a user's desire. Such extensions may be linear and/or rotationally extractible. As an example, an extension may be extractible and detachable, for example, to be positioned for attachment to act as a support.

Figure 4:
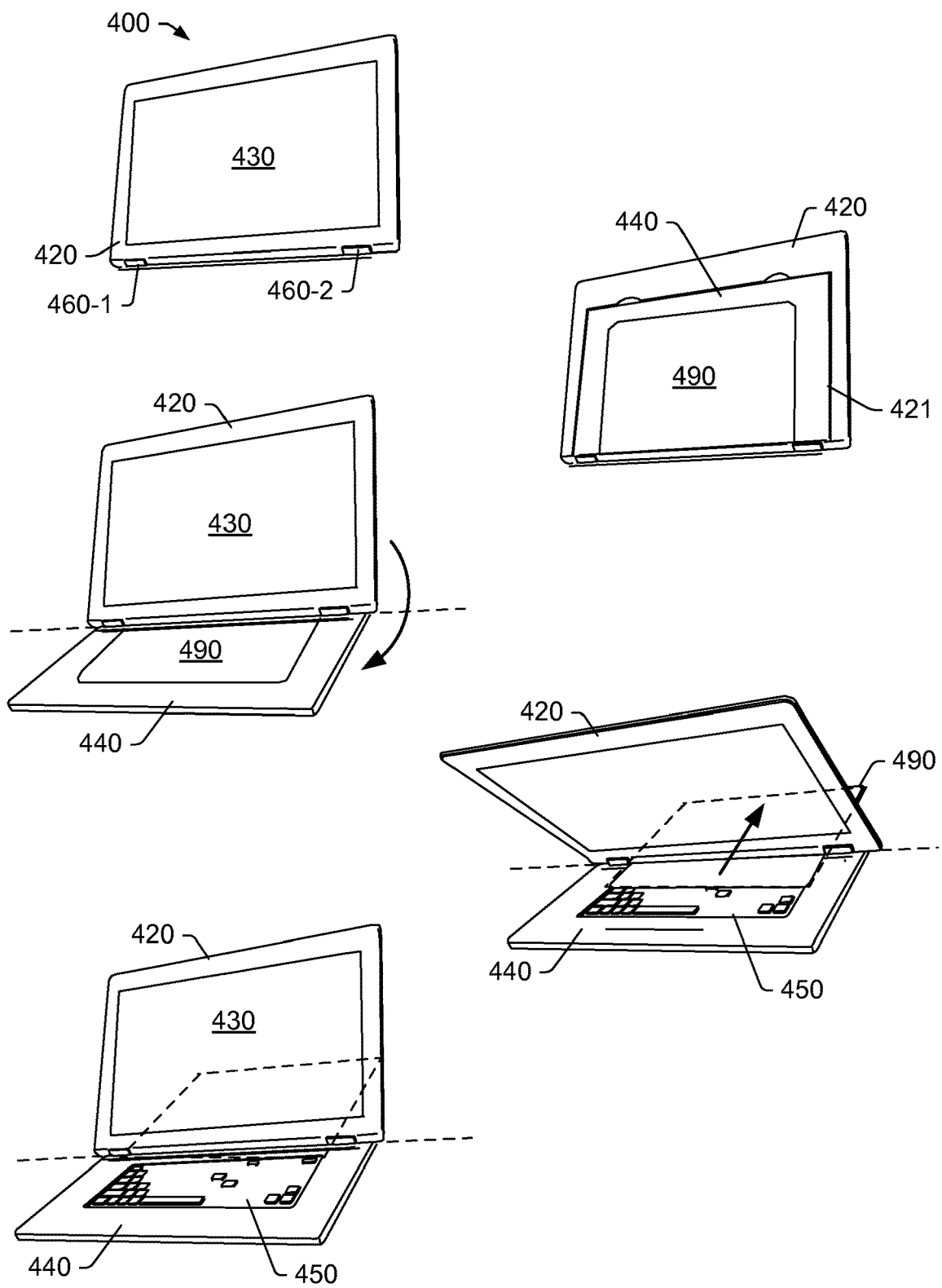
FIG. 4 is a diagram of an example of a device.

FIG. 4 shows an example of a device 400 that includes a display housing 420, a display 430, a keyboard housing 440, a keyboard 450 and an extractible extension 490 that may function as a keyboard cover. The device 400 may include various features such as those described with respect to the device 100 of FIG. 1. As an example, the keyboard housing 440 may be positionable to have keys of the keyboard 450 facing outwardly in a recess 421 of the display housing 420. As an example, the keyboard housing 440 may be removable from the recess 421 and positionable to support the display housing 420 with the keys of the keyboard 450 facing upwardly. As an example, the keyboard housing 440 may be operatively coupled to the display housing 420 via one or more hinges 460-1 and 460-2 that can allow for pivoting of the keyboard housing 440. In a pivoted orientation, the extractible extension 490 may be extended to reveal keys of the keyboard 450 and to support the display housing 420 at a viewing angle. In such an example, the extractible extension/keyboard cover 490 may reduce risk of tipping of the display housing 420.

Figure 5:
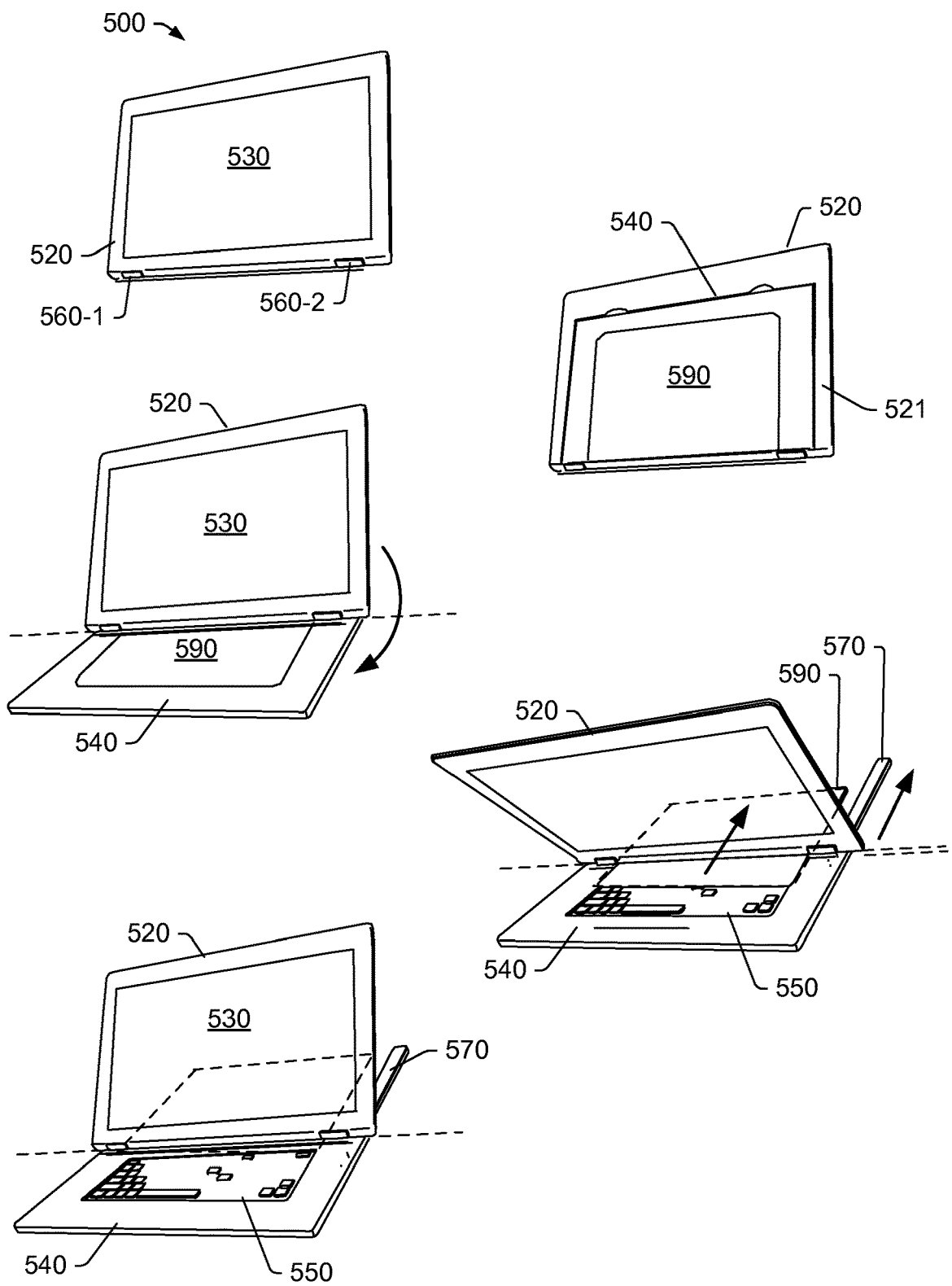
FIG. 5 is a diagram of an example of a device.

FIG. 5 shows an example of a device 500 that includes a display housing 520, a display 530, a keyboard housing 540, a keyboard 550, an extractible extension 570 and a keyboard cover 590 that may function as an extractible extension. The device 500 may include various features such as those described with respect to the device 100 of FIG. 1. As an example, the keyboard housing 540 may be positionable to have keys of the keyboard 550 facing outwardly in a recess 521 of the display housing 520. As an example, the keyboard housing 540 may be removable from the recess 521 and positionable to support the display housing 520 with the keys of the keyboard 550 facing upwardly. As an example, the keyboard housing 540 may be operatively coupled to the display housing 520 via one or more hinges 560-1 and 560-2 that can allow for pivoting of the keyboard housing 540. In a pivoted orientation, the extractible extension 570 may be extended and the keyboard cover 590 may be translated to reveal keys of the keyboard 550. In such an example, the extension 570, and optionally the keyboard cover 590, may provide support to support the display housing 520 at a viewing angle. In such an example, the extractible extension 570 and the keyboard cover 590 may reduce risk of tipping of the display housing 520.

Figure 6:
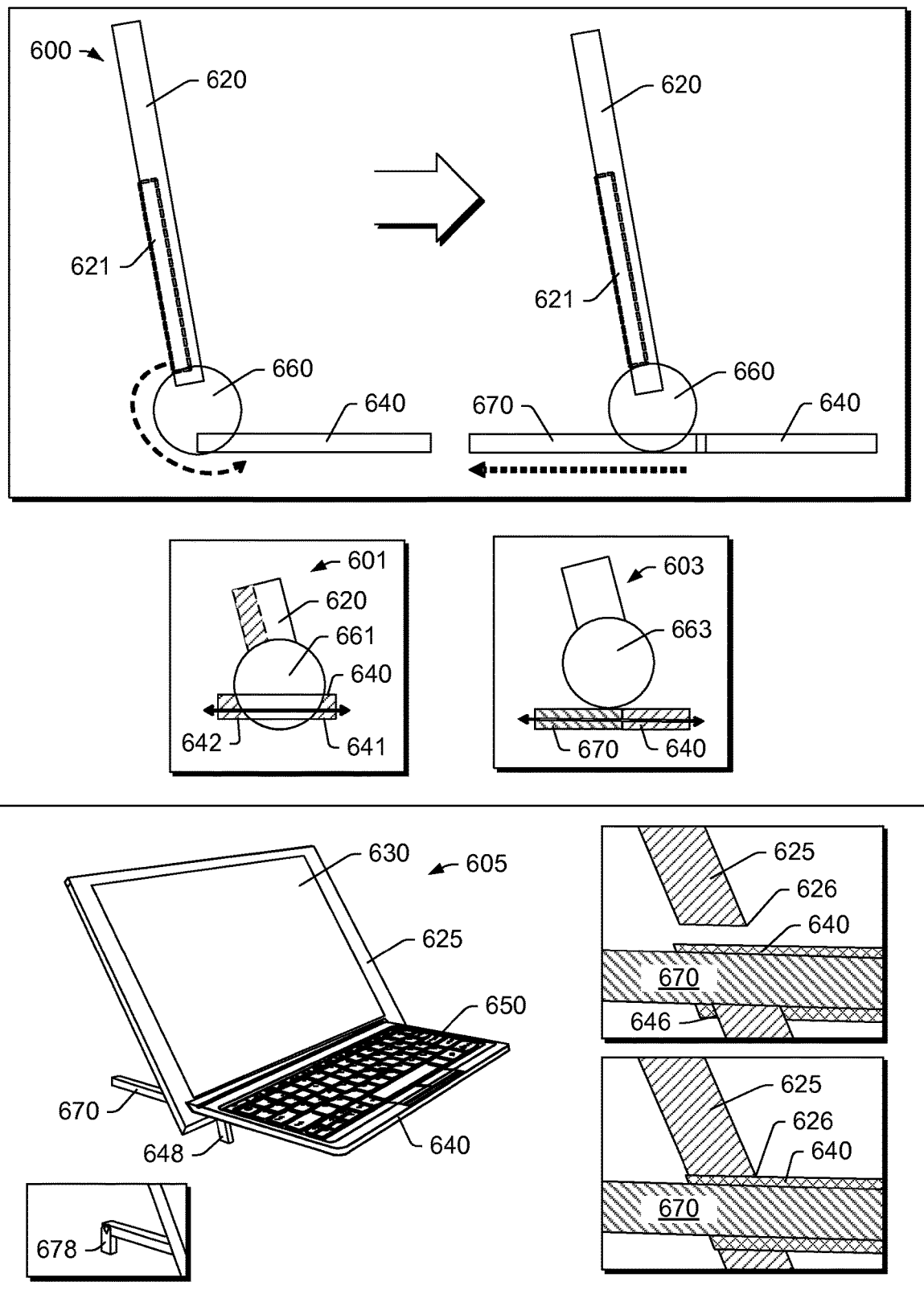
FIG. 6 is a diagram of examples of devices.

FIG. 6 shows an example of a device 600 that includes a display housing 620, a display 630, a keyboard housing 640, a keyboard 650 and an extractible extension 670. The device 600 may include various features such as those described with respect to the device 100 of FIG. 1. As an example, the keyboard housing 640 may be positionable in a recess 621 of the display housing 620. As an example, the keyboard housing 640 may be removable from the recess 621 and positionable to support the display housing 620 with the keys of the keyboard 650 facing upwardly. As an example, the keyboard housing 640 may be operatively coupled to the display housing 620 via one or more hinges 660 that can allow for pivoting of the keyboard housing 640. In a pivoted orientation, the extractible extension 670 may be extended. In such an example, the extension 670 may provide support to support the display housing 620 at a viewing angle. In such an example, the extractible extension 670 may reduce risk of tipping of the display housing 620.

FIG. 6 also shows example devices 601, 603 and 605. As shown, the example device 601 includes a hinge 661 that can receive the keyboard housing 640 to position a portion 641 of the keyboard housing 640 on one side of the display housing 620 and to position another portion 642 of the keyboard housing 640 on the other side of the display housing 620 (e.g., a rotational wing passes through a hinge).

As shown, the example device 603 includes a hinge 663 where the keyboard housing 640 and the extension 670 are positionable below the hinge 663 (e.g., a rotational wing passes underneath a hinge). As shown, the example device 605 includes a display housing 625 that includes a slot 626 that can receive at least a portion of the keyboard housing 640 such that the extension 670 may extend from the keyboard housing 640 to a back side (e.g., recess side) of the display housing 640. As shown, as an example, the keyboard housing 640 may include a channel 646 that can be seated with respect to a portion of the display housing 640. For example, a portion of the keyboard housing 640 may pass through the slot 626 of the display housing 625 to position the channel 646 with respect to an edge of the display housing 625 that defines in part the slot 626. While the channel 646 is illustrated in FIG. 6 as being on a lower side of the keyboard housing 640, a channel may be positioned on an upper side of the keyboard housing 640 (e.g., to be received by an upper edge that defines in part the slot 626).

As shown in FIG. 6, a keyboard housing may include one or more feet. For example, consider the foot 648 of the keyboard housing 640 of the device 605. In such an example, another foot may be provided on the other side of the keyboard housing 640. Such a foot or feet may provide for additional contact surface for contacting a surface such as a surface of a table, a desk, etc. As an example, a keyboard housing may include a single foot that may be positioned centrally, at an edge, proximate to an edge, etc. As an example, a foot may be a swing out foot that may be optionally extended by a user, for example, where additional support surface is desired.

As an example, an extension may include a tail that can be positioned to provide for contact with a surface such as a surface of a table, a desk, etc. For example, FIG. 6 shows a tail 678 that may be coupled to the extension 670 via a joint. In such an example, the tail 678 may be rotated or otherwise positioned to provide for contact or to otherwise reduce risk of tipping (e.g., enhance stability) of the display housing 625 of the device 605.

Figure 7:
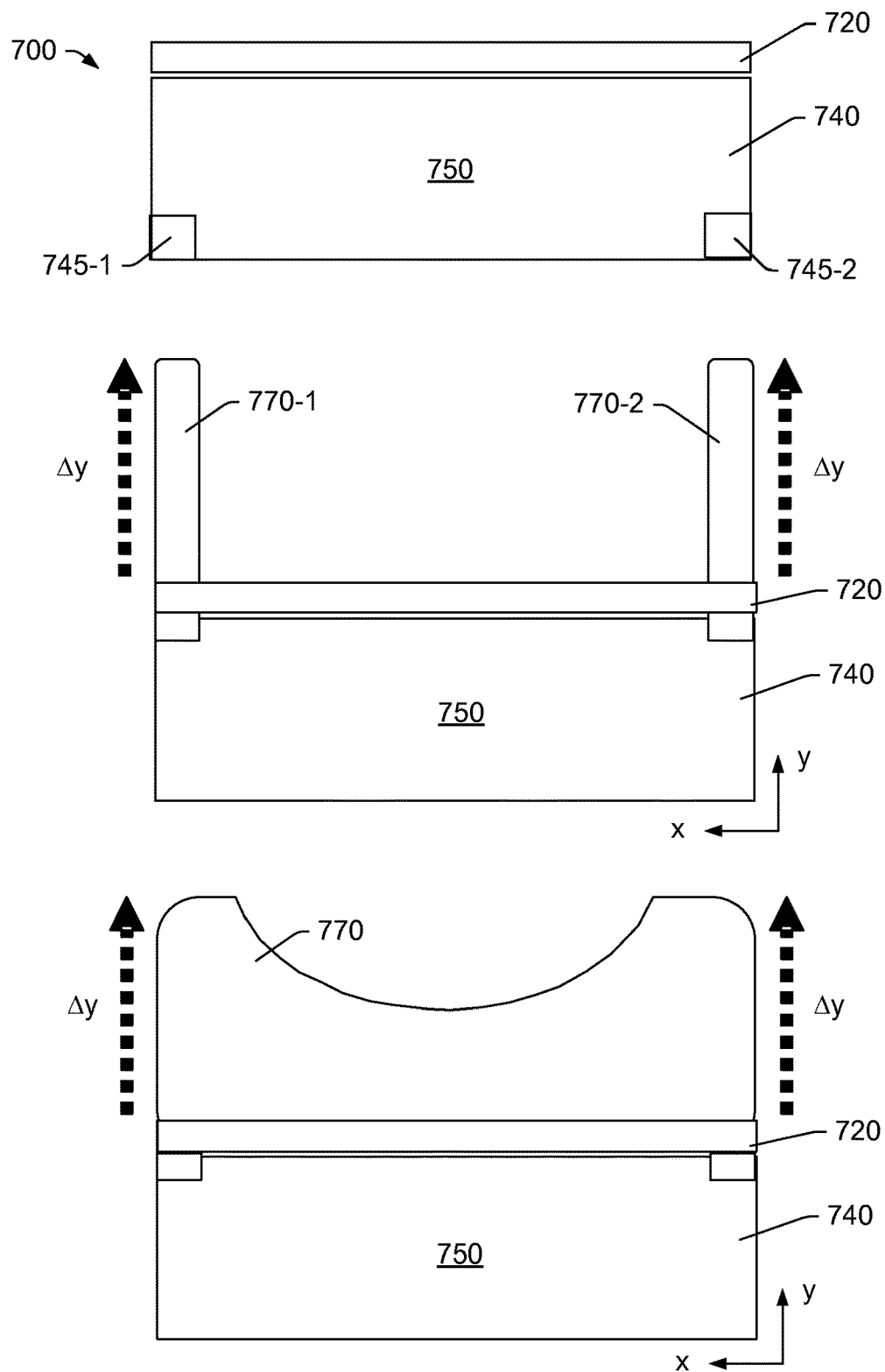
FIG. 7 is a diagram of examples of devices.

FIG. 7 shows an example of a device 700 that includes a display housing 720, a keyboard housing 740, a keyboard 750 and one or more extractible extensions 770 or 770-1 and 770-2. As an example, the keyboard housing 740 may include one or more actuation tabs 745-1 and 745-2 that may be depressible or otherwise movable to release the one or more extractible extensions 770 or 770-1 and 770-2. As an example, the actuation tabs 745-1 and 745-2 may be portions of the extensions 770-1 and 770-2 such that pushing the tab 745-1 causes the extension 770-1 to extend and pushing the tab 745-2 causes the extension 770-2 to extend. The device 700 may include various features such as those described with respect to the device 100 of FIG. 1.

As an example, a device can include a rotational and slide out keyboard and stand combination component. In such an example, the device may include two pronged slide out stand elements (see, e.g., the extensions 770-1 and 770-2). As an example, a device may include a solid style slide out stand element (see, e.g., the extension 770).

As an example, a device can include a processor; memory operatively coupled to the processor; a keyboard housing that includes a keyboard accessible to the processor; and a display housing that includes a display operatively coupled to the processor and a keyboard housing recess, where, in a compact orientation, the keyboard housing seats in the keyboard housing recess and where, in an extended orientation, the keyboard housing forms a base, in part on a display side of the display housing and in part on a non-display side of the display housing, that supports the display housing at a viewing angle with respect to the base. In such an example, the display housing can include a slot that, in the extended orientation, receives the keyboard housing. In such an example, the keyboard housing can include a channel that seats the keyboard housing with respect to a portion of the display housing that at least in part defines the slot. As an example, a keyboard housing can include one or more feet.

As an example, a device can include wireless communication circuitry that at least in part operatively couples a keyboard of a keyboard housing to a processor. As an example, such circuitry may be RF, IR, Bluetooth®, or other type of wireless communication circuitry.

As an example, a device can include a processor; memory operatively coupled to the processor; a keyboard housing that includes a keyboard and a first keyboard interface; and a display housing that includes a display operatively coupled to the processor, a second keyboard interface and a keyboard housing recess, where, in a compact orientation, the keyboard housing seats in the keyboard housing recess and where, in an extended orientation, the keyboard housing forms a base that supports the display housing at a viewing angle with respect to the base and the first keyboard interface electrically contacts the second keyboard interface.

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 8:
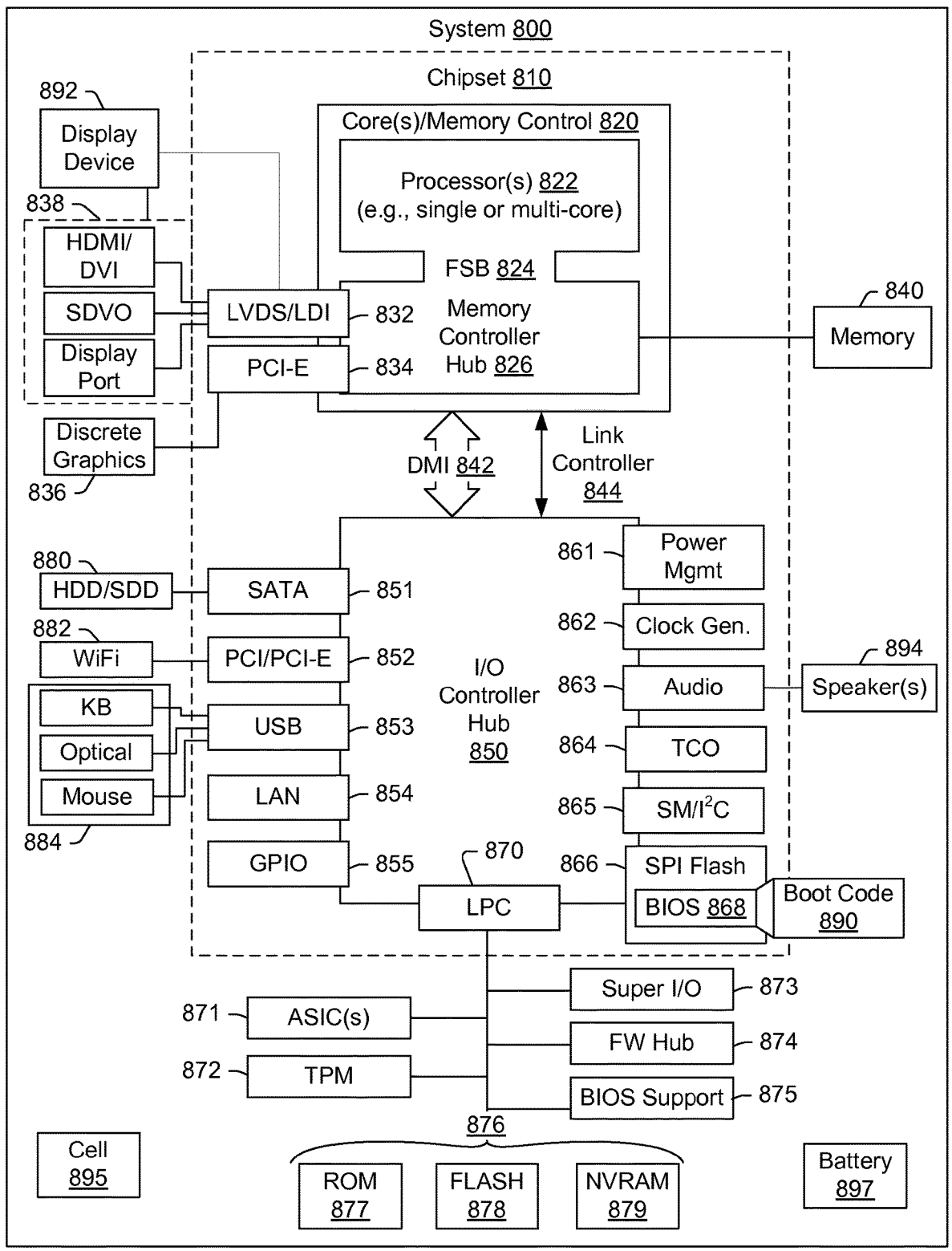
FIG. 8 is a diagram of an example of a system.

While various examples of circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As an example, a device such as one of the devices of FIG. 1, FIG. 2, FIG. 3, FIG. 4, FIG. 6, and FIG. 7 may include at least some of the features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., I$^2$C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As an example, a SMBus may be operable via a LPC (see, e.g., the LPC interface 870), via an I²C interface (see, e.g., the SM/I²C interface 865), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a processor;
memory operatively coupled to the processor;
a keyboard housing that comprises an extractible extension, a back side and an opposing keyboard side that comprises a keyboard accessible to the processor; and
a display housing that comprises a display side, an opposing back side, a display on the display side that is operatively coupled to the processor, a keyboard housing recess on the back side and a supplemental recess on the back side that is adjacent to the keyboard housing recess and that facilitates griping of the keyboard housing to extract the keyboard housing from the keyboard housing recess of the display housing;
wherein, in a compact orientation, the keyboard housing seats in the keyboard housing recess with keys of the keyboard disposed in the keyboard housing recess and facing inwardly and with the back side of the keyboard housing facing outwardly and substantially flush with the back side of the display housing and wherein, in an extended orientation, the keyboard housing and the extractable extension extend to form a base that supports the display housing at a viewing angle with respect to the base.

2. The device of claim 1 comprising a hinge that operatively couples the keyboard housing and the display housing.

3. The device of claim 2 wherein the keyboard housing pivots about the hinge to orient the keyboard housing in a recessed state that corresponds to the compact orientation or a base state that corresponds to the extended orientation.

4. The device of claim 3 wherein the keyboard housing is pivotable about the hinge by a pivot angle greater than 180 degrees.

5. The device of claim 2 wherein the hinge comprises a swivel hinge.

6. The device of claim 1 wherein, in the extended orientation, the keyboard housing is positioned on the display side of the display housing and wherein the extractable extension is extended away from the keyboard housing and positioned on the back side of the display housing.

7. The device of claim 1 wherein the keyboard housing comprises a plurality of extractable extensions.

8. The device of claim 1 wherein, in the extended orientation, the keys of the keyboard are oriented upwardly.

9. The device of claim 1 comprising an intermediate orientation wherein the keyboard housing, with the extractable extension in an unextracted state, is positioned to form an angle with respect to the display housing.

10. The device of claim 1 wherein the keyboard comprises depressible keys.

11. The device of claim 1 wherein the keyboard comprises a touch-sensitive panel.

12. The device of claim 1 wherein the display comprises a touch-sensitive display.

13. The device of claim 1 comprising wireless communication circuitry that at least in part operatively couples the keyboard of the keyboard housing to the processor.

14. The device of claim 1 comprising a swivel mechanism that swivels the keyboard housing with respect to the display housing to orient the keys of the keyboard.

15. The device of claim 14 wherein the swivel mechanism comprises a swivel hinge.

16. The device of claim 15 wherein the keyboard housing is operatively coupled to the display housing via the swivel hinge.

17. The device of claim 15 wherein the swivel hinge is located centrally between two edges of the keyboard housing.

18. The device of claim 15 wherein the swivel hinge provides for pivoting and swiveling of the keyboard housing with respect to the display housing.

* * * * *